Sept. 15, 1970  H. T. HODGES  3,528,738
METHOD AND APPARATUS FOR SCAN LIGHTING IN PHOTOCOPY
PROJECTION EQUIPMENT
Filed Dec. 7, 1967  2 Sheets-Sheet 1

HOWARD T. HODGES
INVENTOR.

BY
ATTORNEYS

United States Patent Office 3,528,738
Patented Sept. 15, 1970

3,528,738
METHOD AND APPARATUS FOR SCAN LIGHTING IN PHOTOCOPY PROJECTION EQUIPMENT
Howard T. Hodges, Rochester, N.Y., assignor to Eastman Kodak Company, Rochester, N.Y., a corporation of New Jersey
Filed Dec. 7, 1967, Ser. No. 688,737
Int. Cl. G03b 27/54
U.S. Cl. 355—70                           1 Claim

ABSTRACT OF THE DISCLOSURE

A plurality of light sources traverse an original to be copied. They are arranged to follow an endless path which brings a second light source into position to traverse the original as a first light source is finishing. The first source is then recycled eliminating the need for reciprocating a single light source for each cycle of operation.

BACKGROUND OF THE INVENTION

Field of the invention

The invention pertains to the field of scan lighting an original which is to be reproduced by photocopying equipment. Thus, the field of art of the invention is the method and apparatus for scan lighting an original during the exposure cycle of a photocopying machine.

Description of the prior art

In one form of the prior art the entire surface of an original has been flooded with light from a plurality of lamps during optical scanning. An example of such overall illumination of the original is shown in U.S. Pat. No. 3,221,622 to Aser et al., issued Dec. 7, 1965. Distributing light over the entire surface of the original necessarily limits the intensity of illumination of the original which can be achieved practically and brings on the problem of achieving a uniform light level for all portions of the original.

Experience has shown that where the sensitivity of the photoresponsive surface is comparatively low, the illuminating of the entire original is unsatisfactory since the low level of lighting in the area being scanned necessitates a slow scanning speed and, consequently, a limited production rate for the photocopying machine. This problem of comparatively low sensitivity can arise whenever the photoresponsive surface is to be formed of relatively slow photoconductive material rather than relatively fast silver halide material.

Where it is desired to concentrate the light being applied to the original during a scanning operation, scan lighting systems have been provided in the prior art which restrict the light to the specific area being optically scanned at any instant and which move the source of light in synchronism with the optical scanning device. An example of such an arrangement is shown in U.S. Pat. No. 3,062,108 to Mayo, issued Nov. 6, 1962.

In such prior art, it is customary to return both the scanning lights and an optical slit scanner to the beginning position at the conclusion of each scanning cycle. Even though the moving scanning system can apply a higher level of illumination by concentrating the light to the specific area being scanned, the need to reciprocate the relatively heavy scanning light system limits the speed of operation of the photocopying apparatus. Thus, if an attempt is made to increase the production rate of the machine by increasing the rate of scan, high levels of acceleration and deceleration accompanied by excessive inertia forces resulting from the reciprocating motion of the light scanning system are soon encountered. Another problem preventing high speed operation is the amount of time which must be lost in making provision for a reciprocating light scanning system to be returned to its starting point for the subsequent scan.

In systems in which the photosensitive surface, original, and all optics are kept stationary while only the illumination system scans the original, the need to reciprocate the illumination system is an even more critical limitation on the system than in systems employing optical scanning, because such stationary systems are not limited by mechanical movement in the optical system.

SUMMARY OF THE INVENTION

It is one of the objects of the invention to increase the rate of operation of a moving scan lighting system without encountering excessive inertia loads and complex reciprocal drives.

It is another object of the invention to minimize the time period between the end of one light scan and the beginning of the subsequent light scan.

It is an additional object of the invention to reduce the duty cycle of the sources of the light scanning system while maintaining a high cyclic rate of operation.

It is a further object of the invention to provide a scan lighting system which can be employed with photoresponsive material of comparatively lower sensitivity such as that of photoconductive material.

The invention constitutes an improvement in a light scanning system for focusing an image of an original onto a photoresponsive surface. In accordance with the invention, a plurality of sources of radiant energy such as light are each connected with an interval therebetween to means for sequentially moving each of the sources along an endless path having a portion extending adjacent to the composing position, so that as one source finishes scanning the next is in position to begin. If optical scanning is used, the means for moving the plurality of sources operates substantially in synchronism with the optical scanning means in order to concentrate the radiant energy being applied to the area being scanned. With this arrangement, the need for reciprocating the light source is eliminated along with the high inertia forces and the complexity of mechanical drives associated therewith. In addition, the provision of a plurality of sources and an endless drive operation in a common direction enables the interval between scanning cycles to be appreciably reduced and enables the driving means to operate continuously in a single direction thereby eliminating undesirable high inertia loads.

BRIEF DESCRIPTION OF THE DRAWINGS

Additional objects and features of the invention will be understood from the following specification and from the drawings in which.

DESCRIPTION OF THE PREFERRED EMBODIMENT

Figures 1, 2:
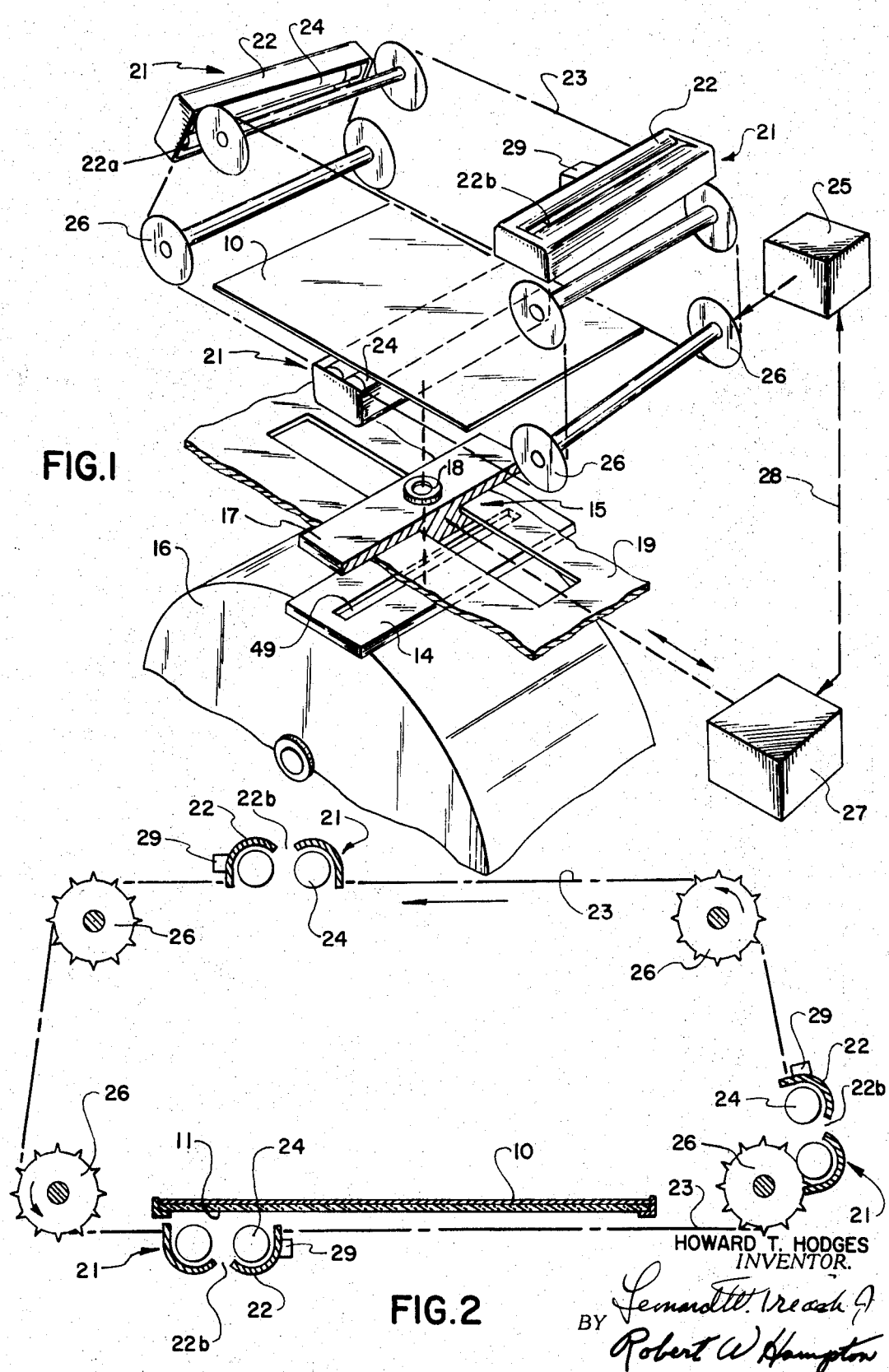
FIG. 1 is a fragmentary perspective view showing the scan lighting system of the invention in conjunction with an optical scanning system and a photoresponsive surface.
FIG. 2 is a fragmentary vertical section view showing the scan lighting system of the invention.

As shown in FIG. 2, the means for supporting the original 10 at a predetermined composing position includes stationary composing surface 11 disposed adjacent to the path of travel of chain conveyor 23. The optical scanning system shown in FIG. 1 is adapted to direct a scanned image of the original onto a photoresponsive surface, for example, an electrically photoresponsive surface, such as a photoconductive surface of a drum 16.

Lens system 15 includes a carriage 17 upon which is mounted a lens 18. The carriage is slidably mounted upon a support 19.

The means moving with the optical scanning unit for applying radiant energy such as light to the portion of the original being scanned includes a plurality of sources of radiant energy or light scanning units 21.

In scanning the original 10, the light scanning units 21 are driven by the chain conveyor 23 which extends about and is supported by sprockets 26. By way of example, the chain conveyor 23 can operate in the direction of the arrow shown in FIG. 2. Each of the light scanning units includes a housing 22 having an opening 22a adapted to face the composing surface 11 and a slot 22b disposed opposite said opening 22a. The slot extends parallel to the longitudinally axis of the light scanning unit.

In operation, light scanning units 21 are moved from left to right along the lower reach of the chain conveyor 23 as viewed in FIG. 2. At the same time, the lens 18 is moved from left to right. In this way, the original 10 is scanned and the resulting image is directed through a slit 49 onto the surface of the rotating drum 16.

The scanning units 21 include sources of radiant energy, for example, light, and include lamps 24 mounted within housing 22 and extending for the length of the housing parallel to the slot 22b. The internal surface of the housing 22 can serve as a reflector for concentrating the light of the lamps 24 onto the adjacent area of original 10 during scanning.

In operation chain conveyor 23 is driven by drive 25 which is coupled to at least one of sprockets 26. Drive 25 operates chain conveyor 23 continuously in one direction so that the plurality of the light scanning units 21 sequentially pass adjacent to the composing surface 11. The interval between the light scanning units is selected to enable one unit to pass beyond the composing surface as the next unit arrives adjacent to the composing surface. As a result, the time between the end of one scan and the beginning of another scan can be reduced to a minimum value. In addition, the constant direction drive applied to the endless chain conveyor 23 and the plurality of light scanning units enables the number of images to be scanned in a given amount of time to be greatly increased without encountering the difficulties of excessive inertia forces which accompany a reciprocating scan lighting system operating at the same production rate.

Light scanning units 21 travel substantially in synchronism with lens system 15, although at a faster rate. The lens system can be driven in a reciprocating manner by drive 27 coupled to carriage 17. As schematically shown by connection 28, drive 25 for the light scanning units can be timed or synchronized with drive 27 to optical scanning slit 14 and lens system 15. Since the drives to the lens system and the photoresponsive drum, control the manner in which the image is formed upon the drum, precision drives and synchronization are required for these elements. On the other hand, a precision drive is not necessary for the light scanning units since the illumination of the original is not a factor in copy resolution. Thus, it is sufficient that the light scanning units merely be substantially synchronized with the optical scanning unit and the moving photosensitive surface.

Since the full output of the lamps 24 is only required when the light scanning units are being advanced adjacent to composing surface 11, the lamps may be operated at reduced voltage after each of the scanning units passes beyond the end of the composing surface. For example, each of the light scanning units 21 is provided with means such as switching device 29 for controlling the voltage applied to the lamps during the scanning of the original along the lower reach of conveyor 23 and during thte return path of travel along the vertical and upper reaches of the conveyor for the next scanning cycle. In this way, the lamps are operated at maximum voltage along the lower reach of the chain conveyor and then at reduced voltage elsewhere.

Since the lamps within the light scanning units are located adjacent to the original, a maximum unit brightness is achieved. By way of example, two 1,000-watt lamps when mounted in the housing 22 close to the original in order to concentrate the entire light output of the lamps onto the small area being scanned at any instant, produces a light level of approximately 34 foot-candles in the image plane. A light level of this magnitude is capable of forming satisfactory photoresponsive images on photoconductive material even when the photocopying apparatus is operated at a high cyclic rate. Consequently, the plurality of light scanning units operating in a single direction and their high level of light output concentrated on the scanning area of the original enable a copying machine employing a less sensitive material such as photoconductive material to operate with a high rate of production previously not attainable.

It should be noted that optical scanning systems other than lens system 15 can be used in conjunction with the plurality of light scanning units 21. For example, a pivotally mounted scanning mirror can reflect the light scanned from the original onto a photoresponsive drum and such an arrangement can be used where it is desired to eliminate the need to reciprocate lens system 15. In addition, it should be noted that more than one image can be scanned during a single revolution of the drum. Thus, for example, the light scanning units, the optical scanning slit and the lens system can be operated in a manner to produce two or more images on the surface of drum 16 during a single revolution of the drum. Again, the continuous movement of the plurality of light scanning units in a single direction enable a higher speed of operation to be achieved.

Figure 3:
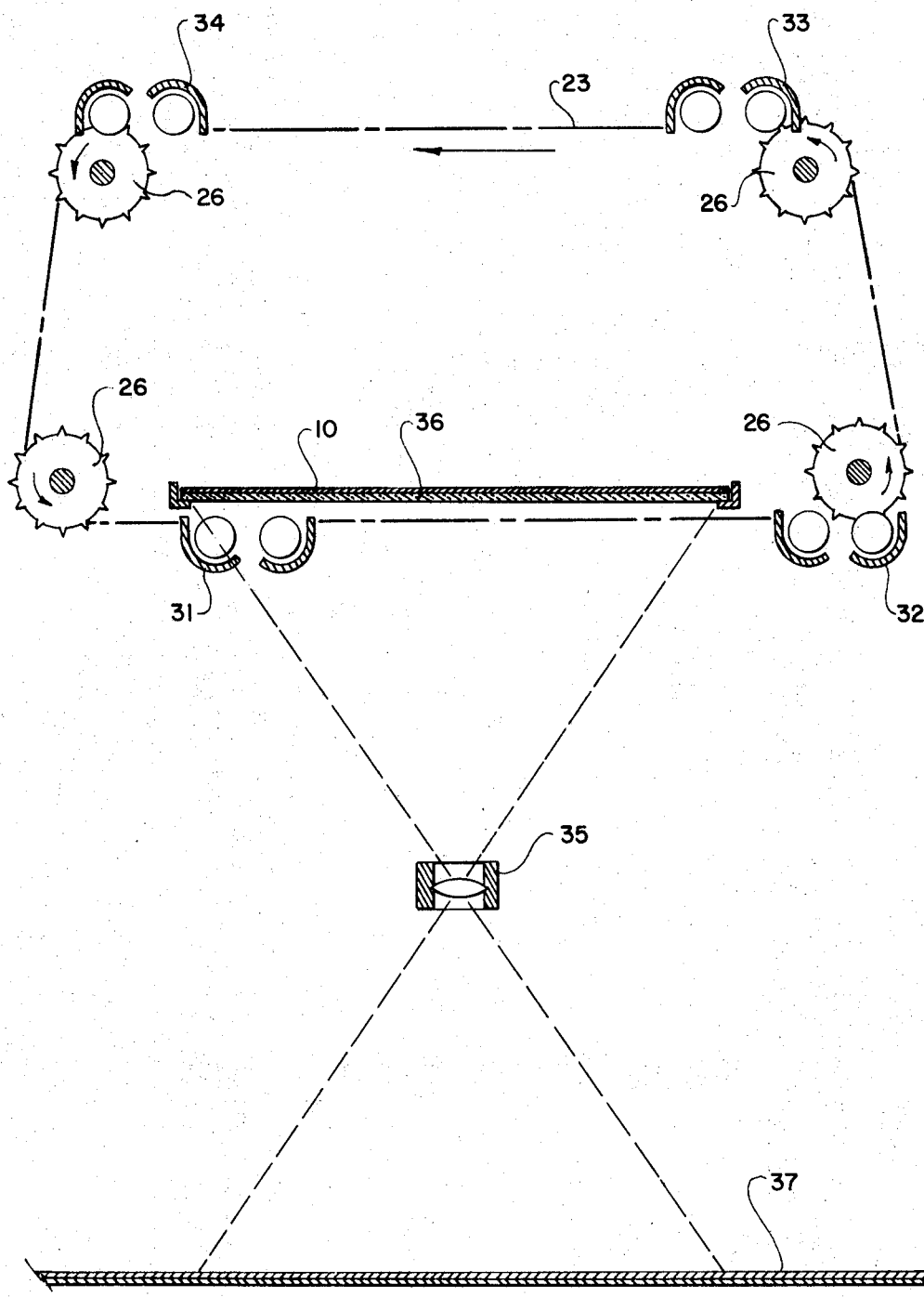
FIG. 3 is a fragmentary vertical section view showing the scan lighting system of the invention with a stationary projection system.

The invention is particularly suited to systems in which the illumination system scans the original while the optical system remains stationary as shown in FIG. 3. Illumination units 31, 32, 33 and 34 sequentially illuminate an original 10 placed on window 36 as in FIG. 1 while stationary lens system 35 projects an image of such original onto a stationary photosensitive member 37. With stationary optics and use of the invention in the illuminating system, the major speed limiting part of the system becomes a means giving intermittent motion of photosensitive member 35. This can be made quite slight by using a low inertia photosensitive member such as a flexible web.

The invention has been described in detail with particular reference to preferred embodiments thereof, but it will be understood that variations and modifications can be effective within the spirit and scope of the invention as described hereinabove and as defined in the appended claim.

I claim:

1. In an optical scanning system for focusing an image of an original onto an electrically photoresponsive surface including means for supporting the original at a predetermined composing position, means for optically scanning the original through a scan cycle to repetitively direct an optical image thereof toward the photoresponsive surface, and means moving in timed relation with the scanning means for applying radiant energy to the portions of the original being scanned, the improvement wherein said means for applying radiant energy comprises:

a plurality of sources of radiant energy spaced along an endless path, part of which path is in scan lighting relation with said original, means connected to each of said plurality of sources for moving each of said sources in a common direction along said endless path substantially in synchronism with said optical scanning means, and said sources being spaced so that a radiant source begins scanning said original at the beginning of each scan cycle, each of said plurality of sources of radiant energy including:

an elongated housing having a longitudinal axis extending transversely with respect to said endless path, a side of said housing which faces the composing position when scanning said original having a first opening extending substantially along the length thereof, another side of said housing disposed opposite said side having a second opening extending along the length thereof, at least one lamp disposed within said housing and adapted to direct light through said first opening toward an original at the composing position, whereby the light of said lamp reflected from the original can pass through said second opening toward the scanning means, and means for reducing the level of energy supplied to said lamp of each of said housings when said housing is moved away from adjacent the composing position of the supporting means and for restoring the level of energy supplied to said lamp to a predetermined level necessary for illuminating the original when the housing is moved adjacent the composing position of the supporting means.

References Cited

UNITED STATES PATENTS

| | | | |
|---|---|---|---|
| 2,153,186 | 4/1939 | Henderson | 355—70 |
| 2,760,419 | 8/1956 | Gelb | 355—84 |
| 3,381,573 | 5/1968 | Caldwell | 355—8 |

NORTON ANSHER, Primary Examiner

D. J. CLEMENT, Assistant Examiner

U.S. Cl. X.R.

355—8, 48, 84